US005723843A

United States Patent [19]

Muggli

[11] Patent Number: 5,723,843

[45] Date of Patent: Mar. 3, 1998

[54] METHOD OF FORMING AND BALANCING AN ILLUMINATED DISPLAY PANEL

[75] Inventor: Dale Muggli, Bothell, Wash.

[73] Assignee: Illuminated Display Division of Bell Industries, Inc., Redmond, Wash.

[21] Appl. No.: 10,550

[22] Filed: Jan. 28, 1993

[51] Int. Cl.[6] .............................. B23K 26/00; G09F 13/08

[52] U.S. Cl. .............................. 219/121.69; 216/4; 216/94; 356/432; 362/30; 40/541; 264/22

[58] Field of Search .............................. 219/121.61, 121.62, 219/121.67, 121.68, 121.69, 121.72, 121.83, 121.85; 427/161, 164, 555, 554, 596; 156/626.1, 643.1; 356/432, 433, 237, 239; 264/1.7, 2.7, 40.1, 139, 22, 25; 362/23, 29, 30; 216/4, 5, 65, 94; 40/541

[56] References Cited

U.S. PATENT DOCUMENTS

| | | | |
|---|---|---|---|
| 4,012,632 | 3/1977 | Stone | 362/23 |
| 4,148,065 | 4/1979 | Nakagawa et al. | 219/121.68 |
| 4,588,885 | 5/1986 | Lovoi et al. | 219/121.62 |
| 4,791,267 | 12/1988 | Yokoyama et al. . | |
| 4,959,275 | 9/1990 | Iguchi et al. . | |
| 4,968,526 | 11/1990 | Takii et al. . | |
| 4,985,116 | 1/1991 | Mettler et al. . | |
| 5,066,132 | 11/1991 | Nagata et al. | 356/432 |
| 5,235,400 | 8/1993 | Terasawa et al. | 356/237 |

FOREIGN PATENT DOCUMENTS

| | | | |
|---|---|---|---|
| 1233077 | 9/1989 | Japan | 219/121.69 |

*Primary Examiner*—Teresa J. Walberg
*Assistant Examiner*—Gregory L. Mills
*Attorney, Agent, or Firm*—Poms, Smith, Lande & Rose

[57] ABSTRACT

The present invention concerns a novel method for balancing an illuminated display panel to achieve a predetermined level of illumination uniformity from indicia formed on the panel. One embodiment of the present invention includes the steps of first fabricating an unbalanced display panel having light translucent and absorptive layers deposited on a panel substrate with indicia formed in the light absorptive layers. The unbalanced panel is illuminated and the amount of light from the indicia formed in the panel are measured to identify illumination deficient indicia. A carbon dioxide laser beam is then focused onto the illumination deficient indicia so as to etch portions of the light translucent layer underlying these indicia and increase the amount of illumination from these indicia. In an alternative embodiment, an illuminated display panel is partially fabricated by applying a light translucent layer to a display panel substrate. The partially fabricated display panel is then illuminated and the level of illumination from the translucent layer are measured to identify illumination deficient regions. A carbon dioxide laser beam then etches these illumination deficient regions so as to increase the level of illumination from these regions. Fabrication of the panel is then be completed.

17 Claims, 3 Drawing Sheets

METHOD OF FORMING AND BALANCING AN ILLUMINATED DISPLAY PANEL

FIELD OF THE INVENTION

The present invention is generally directed to illuminated type display panels and, more particularly, an improved method of fabricating illuminated displays and balancing the level of illumination from indicia in the display panel.

BACKGROUND OF THE INVENTION

Illuminated display panels are a widely employed device for presenting visual information to a user where low ambient light conditions are anticipated. Typically illuminated display panels present visual information to a user in the form of light colored indicia on a dark background. In low ambient light conditions these indicia are illuminated in some manner. One highly useful form of illuminated display panel employs a lighting technique known as backlighting to provide self-illumination for the display panel indicia. Backlit type illuminated display panels are typically provided with light sources disposed either within or behind the display panel. Illumination from these light sources projects through the light colored indicia of the panel to provide self illumination for the indicia in low ambient light conditions. Backlit type illuminated displays are commonly used in automobile dashboards and the instrument panels of aircraft.

Backlit type illuminated displays are usually made by applying one or more coatings of light translucent material on a display panel substrate and then covering this light translucent layer, or layers, with a layer of light absorptive or opaque material. If desired, a final coating of some desired color may be also applied over the opaque layer. The cover and opaque layers are then usually etched in some appropriate manner to expose the underlying light translucent layer in a preselected pattern defining the desired indicia.

A normally necessary step in the formation of an illuminated display panel is the balancing of the display so that, when self illuminated, the various indicia of the display have the same level of brightness to within some desired degree of uniformity. It is also usually desirable for the display to have some minimal level of brightness for a given level of self-illumination from the light source of the display panel.

Conventional procedures for balancing an illuminated display so as to achieve minimum and uniform illumination from the indicia of the display panel are often tedious, time consuming and costs intensive. Usually the process of balancing a backlit type illuminated display panel involves first partially fabricating the display panel to the point of applying and curing the light translucent layer to the front of a panel substrate, and similarly applying any light translucent and absorptive layers to be applied to the back of the substrate. The partially fabricated display panel is then illuminated, and the uniformity of illumination from the light translucent layer on the front of the display panel is measured with a detector. Typically this process of measuring the uniformity of illumination from the light translucent layer must be performed by a highly trained technician in a darkened room. Regions of deficient illumination are identified and then carefully abraded by the technician with a small piece of fine sandpaper until a desired level of illumination uniformity is achieved. Often a repetitive process is required in which the technician repeatedly measures the illumination from light deficient regions of the partially fabricated display panel, and then repeatedly abrades these regions until a desired level of illumination from that region is achieved. In some applications, the thickness of the translucent layer may be controlled to a high degree of accuracy in order to minimize the repetitive character of the light balancing process. Normally, however, even in instances where the thickness of the light translucent layer is carefully controlled over the entire surface of the display panel, some light balancing correction must be made to the translucent layer in order to achieve satisfactory light balancing. Once the partially fabricated display panel is light balanced, fabrication of the panel is completed. Typically completion of the fabrication process includes the steps of applying and curing the light absorptive layer and cover layers to the front of the display panel, and forming the indicia in these subsequent layers.

Thus there clearly exists a need for a more economic, and less time and cost intensive, method of balancing illuminated display panels. The present invention fulfills this need.

SUMMARY OF THE INVENTION

Broadly, and in general terms, the present invention provides a method of balancing an illuminated display panel that is both rapid and economical in use. The light balancing method of the present invention may be computer implemented, and does not require a highly trained technician to perform. In one preferred embodiment of the present invention, an illuminated display panel is first fully fabricated, by application of light translucent and light absorptive layers on a panel substrate and formation of appropriate indicia in the display panel, without any light balancing correction of the display panel. This unbalanced panel is then illuminated, and the level of brightness from each of the indicia of the display panel measured with a detector. Indicia having insufficient brightness are then identified, and the pattern of these indicia are re-traced using a carbon dioxide laser beam. The carbon dioxide laser beam etches the light translucent layer directly underneath the insufficiently illuminated indicia, reducing the thickness of the light translucent layer directly beneath the indicia and increasing the amount of light from these indicia. The carbon dioxide laser beam can be controlled to etch thicknesses in the light translucent layer between 0.001 and 0.0002 inches in depth by operating the carbon dioxide laser in a continuous wave mode at power levels between 5 and 50 watts and at a travel rate between 12 and 25 inches per second. These operating parameters provide for a fine control of the increased illumination achieved with each laser etching to between 0.0015 and 0.005 foot-lamberts per etch.

In an alternative embodiment of the present invention, an illuminated display panel is partially fabricated by applying a light translucent layer to a front surface of a display panel substrate. The partially fabricated panel is then illuminated and the panel scanned with a detector to identify regions in the translucent layer having insufficient brightness. These regions are then etched using the carbon dioxide laser beam until a sufficiently uniform degree of illumination is achieved in relevant portions of the front surface of the partially fabricated display panel. Fabrication of the display panel is then completed using any desired fabrication technique.

The novel features of the present invention will be better understood from the following detailed description, considered in connection with the accompanying drawings, wherein like numbers designate like elements. It should be expressly understood, however, that the drawings are for purposes of illustration and description only, and are not intended as a definition of the limits of the present invention.

DETAILED DESCRIPTION

Figure 1:
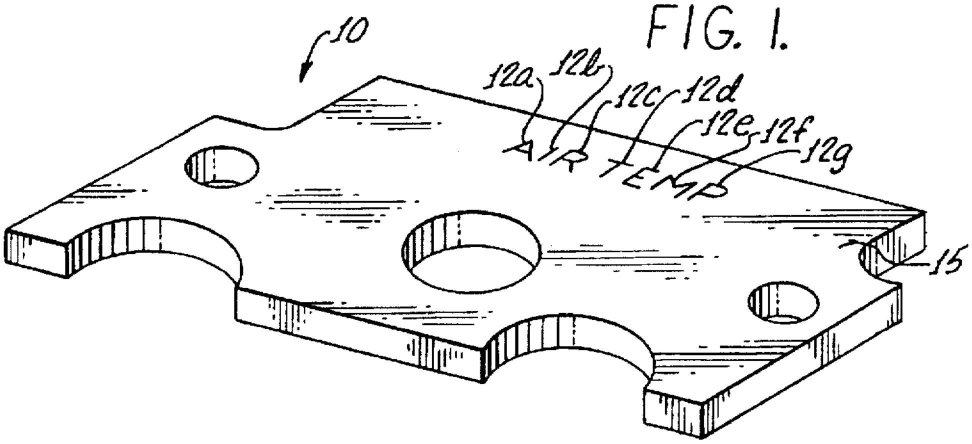
FIG. 1 is a perspective view of an exemplary illuminated display panel.

Referring to the figures, and more particularly FIG. 1, there is shown an illustrative example of an illuminated display panel 10. As illustrated, the display panel 10 is provided with indicia **12*a*–12*g* such as the legend "AIR TEMP" Typically the indicia 12*a*–12*g* are light colored and presented against a dark background 15. In low ambient light conditions, the display panel 10 is illuminated so that light escapes from the indicia 12*a*–12*g* but not from the background 15**, allowing the indicia to remain visible to the user.

Figure 4:
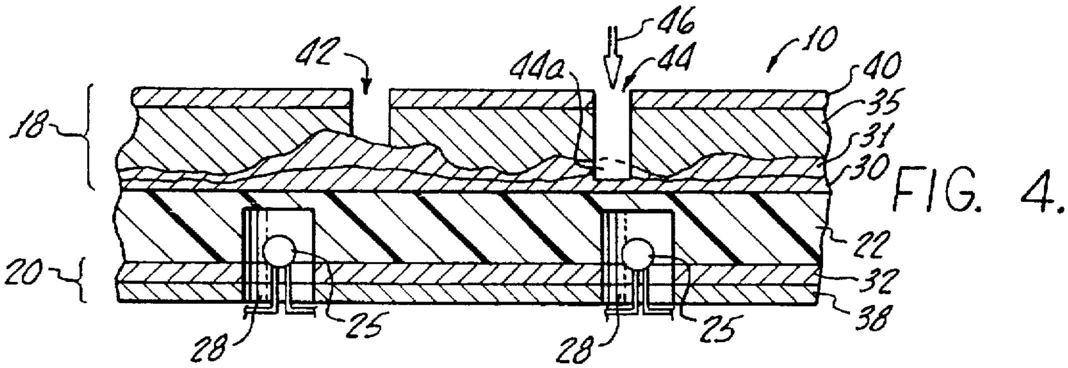
FIG. 4 is a sectional side view of a fully fabricated illuminated display panel made in accordance with one embodiment of the present invention.
Figure 5:
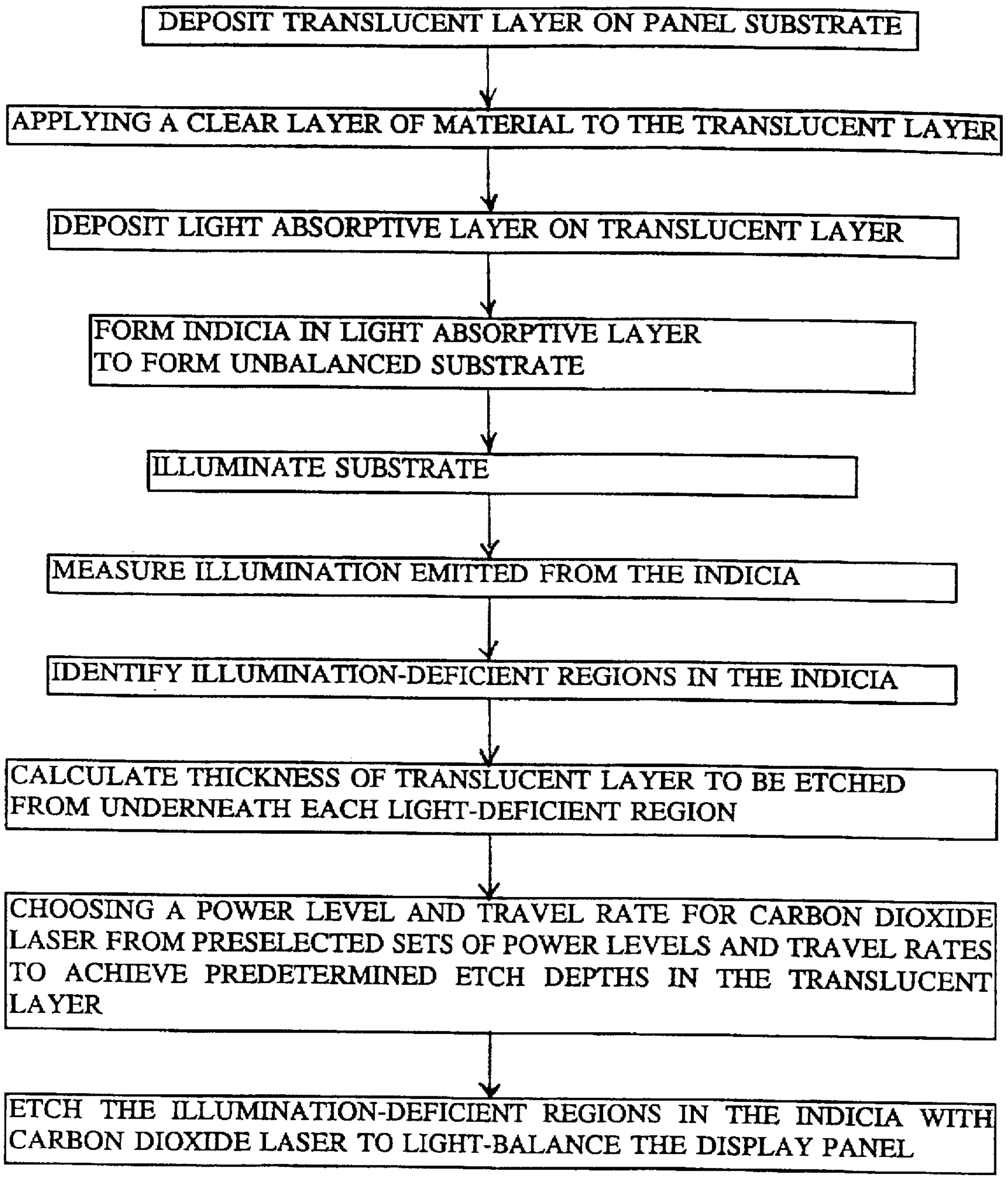
FIG. 5 is a flow chart of a first sequence of process steps according to the present invention.
Figure 6:
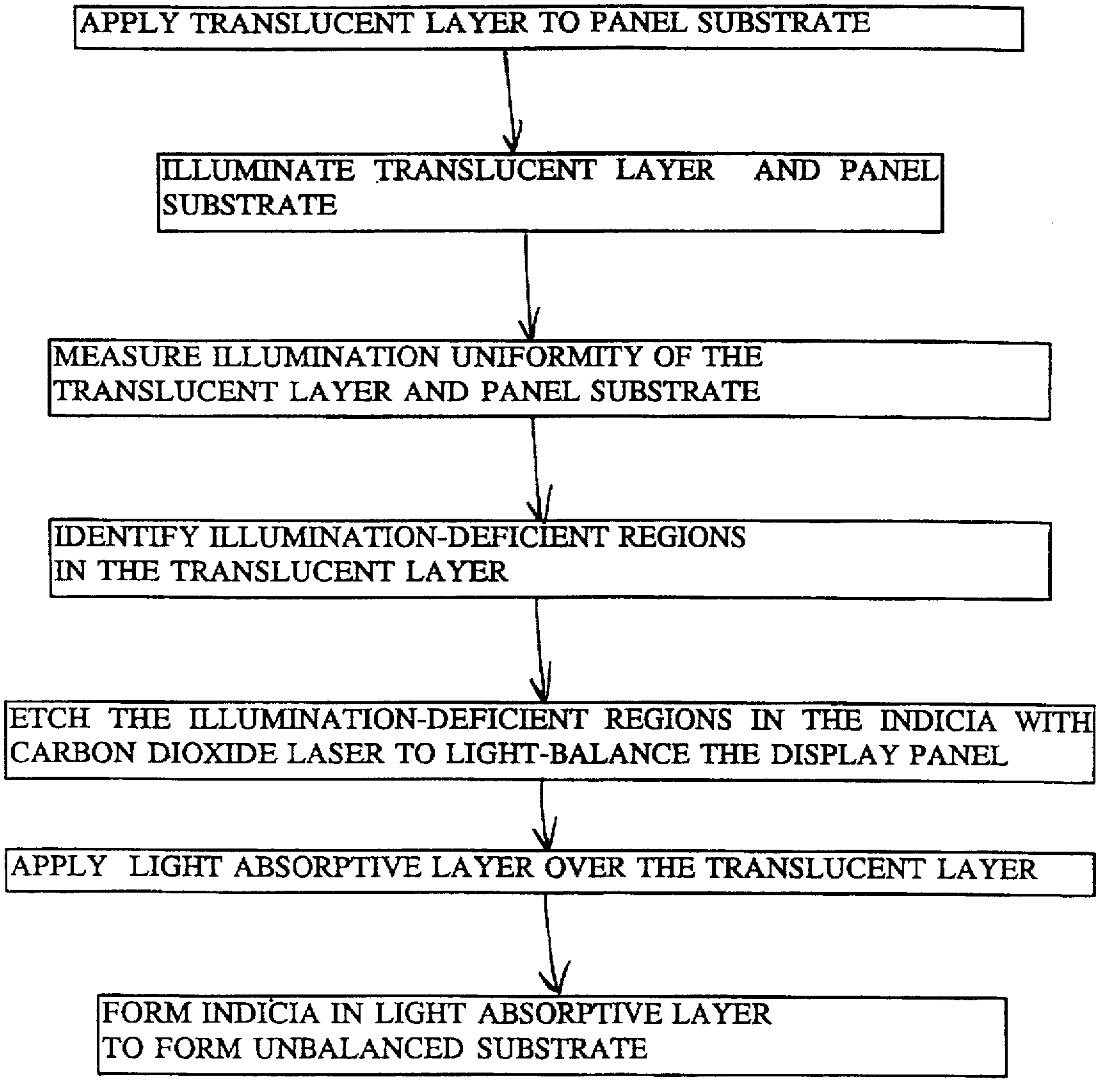
FIG. 6 is a flow chart of a second sequence of process steps according to the present invention.

As illustrated in FIG. 4, showing a sectional side view of the illuminated display panel 10, the panel 10 is made up of a series of layers 18 and 20 respectively applied to front and rear surfaces of a panel substrate 22. Self illumination is provided by lights 25 disposed with partial apertures 28 formed in the rear surface of the panel substrate 22. It should be understood, however, that alternative positioning of lights 25, or some other mode of illumination, could be employed without departing from the spirit of the present invention. Typically, light translucent layers 30 and 32 are respectively applied to both the front and rear surfaces of the panel substrate 22. The front and rear light translucent layers 30 and 32 are in turn covered by front and rear light absorptive layers 35 and 38. A cover layer 40 having some desired color may also be applied to the front of the panel substrate 22, if desired. The indicia **12*a*–12*g* are formed in the front cover layer 40 and the front light absorptive layer 35. Portions of the indicia are illustrated, again in section side view, in FIG. 4 as channels 42 and 44**.

In accordance with one embodiment of the present invention, the illuminated display panel 10 is formed and light balanced by first applying all of the various light translucent, absorptive and cover layers 18 and 20 to the respective front and rear surfaces of the panel substrate 22 and further forming appropriate indicia **12*a*–12*g* in the cover layer 40 and the light absorptive layer 35 applied to the front surface to the panel substrate 22. Application of the light transmissive, absorptive and cover layers, and formation of the indicia, may be accomplished by conventional processes well known in the illuminated display panel art. The various light transmissive, absorptive and cover layers may, for example, be paint layers, applied to the panels substrate 22 by conventional spray painting techniques. Typically, the light transmissive layers 30 and 32 are non-epoxy based white paints and the light absorptive layers 35 and 38 are black paints. As discussed in co-pending patent application Ser. No. 07/989,092, also owned by Bell Industries Illuminated Display Division, a transparent layer, 31 may also be disposed between the light translucent layer 30 and the light absorptive layer 35 applied to the front of the panel substrate 22. Similarly the indicia, such as indicia 12*a*–12*g* may also be formed in the front cover layer 40 and light absorptive layer 35** by conventional processes. A Nd:YAG laser etching process discussed in the above-referenced co-pending patent application Ser. No. 07/989,092, may also be used to form these indicia. Preferably the various light translucent, absorptive and cover layer paints are cured before proceeding with the light balancing and illuminated display panel fabrication process of the present invention.

At this stage of fabrication, the illuminated display panel 10 is not light balanced and various indicia **12*a*–12*g* may have varying degrees of illumination intensity. Thus, for example, indicia 12*a* may be dimmer than some or all of the other indicia 12*b*–12*g*. Alternatively, however, a portion of the single indicia 12*a* may be dimmer than another portion of the same indicia 12*a*. In accordance with the present invention, the partially fabricated display panel 10 is first illuminated and illumination deficient indicia are identified. A carbon dioxide laser beam is then used to etch the pattern of the illumination deficient indicia, removing portions of the light translucent layer 30** directly underneath the illumination deficient indicia and thus increasing the amount of light from these indicia.

Preferably, though not necessarily, the partially fabricated display panel 10 is illuminated in generally the same manner that the display panel 10 is to be subsequently illuminated when in general use. Thus, for example, in applications where a display panel 10 is to be self-illuminated by light sources 25 inserted into apertures 28 formed in the rear surface of the panel substrate 22, an array of light sources 25 suitable for normal use with the display panel 10 may be employed as a panel test unit. Once illuminated, the intensity of light from each of the indicia **12*a*–12*g*** is measured using an appropriate form of detector. In one preferred embodiment of the present invention, a model 1980A photometer available from Photo Research, Inc. is employed for this purpose.

After illuminated deficient indicia, such as for example indicia **12*a*, have been identified or, alternatively, after illumination deficient portions of the various indicia 12*a*–12*g*** have been identified, the carbon dioxide laser etching step is performed to balance the level of illumination from the various indicia of the display panel.

As noted above, the carbon dioxide laser beam is used to retrace the pattern forming the light deficient regions of the indicia. By way of illustration, FIG. 4 presents two channels 42 and 44 representative of indicia shown in section side-view. As shown, the channel forming indicia, such as channel 42, usually project only through the front cover layer 40 and light absorptive layer 35. Typically the indicia channels, such as channels 42 and 45, do not project into the light translucent layer 30. Where light deficient indicia are identified, however, the carbon dioxide laser beam may be used to etch the light translucent layer 30 directly underneath the channel. By way of example, as shown in FIG. 4, a carbon dioxide laser beam 46 may be used to etch a channel region **44*a* in the light translucent layer 30 directly underneath channel 44**.

Removal of a portion of the light translucent layer 30 directly underneath the channel 44 has the effect of increasing the amount of illumination from the indicia formed by channel 44. It has been determined that removal of approximately 0.001 inches of the light translucent layer 30 increases the amount of illumination from the etched indicia by an amount between approximately 0.0015 and 0.005 foot-lamberts, depending on the composition of the light translucent layer 30. It has also been determined that the carbon dioxide laser beam is preferably operated at a power level between 2 and 50 watts in a continuous wave mode, with a travel rate across the display panel surface of between 10 and 25 inches per second. Preferably only 0.001 inches of the light translucent layer is removed each time the carbon dioxide laser beam etches the light translucent layer 30 beneath the light deficient indicia. It has been found that too high a power setting for the carbon dioxide laser beam 46 may scorch the light translucent layer 30 and may disadvantageously heat the light translucent layer 30 to such a degree that the layer 30 separates from the surface of the panel substrate. Too slow of a travel rate for the carbon dioxide laser beam across the surface of the display panel 10 will similarly deliver too much energy to the light translucent layer 30, potentially causing the same scorching and layer separation phenomenon.

After the light deficient indicia, or portions of indicia, have been etched using the carbon dioxide laser beam, the display panel 10 may again be illuminated using a test light source (not shown) and the level of illumination from each of the indicia measured. If any remaining illumination deficient regions are identified, these regions may again be retraced using the carbon dioxide laser beam. It has been determined that increasing the travel rate of the carbon dioxide laser beam, or alternatively decreasing the power level of the laser beam itself, permits control of translucent layer etching to removal of as little as 0.0002 inches per etch. This repetitive process of laser etching and illumination measurement may be repeated until all of the indicia display panel are light balanced to some desired level of illumination uniformity.

Alternatively, however, it is possible to initially measure the illumination deficiency of various indicia such as indicia 12*a*–12*g* and calculate the necessary amount of light translucent layer that should be removed from each deficient region without performing the repetitive steps of remeasuring the amount of light from previously identified illumination deficient indicia after each laser etch. The amount of light translucent layer 30 to be removed from underneath illumination deficient indicia maybe determined utilizing the following equations:

$$B1-B2=B3 \quad (1)$$

$$X1\times B3=PA \quad (2)$$

$$PA=P1\times S1 \quad (3)$$

where:

- B1 is the desired brightness level for each of the indicia on the display panel;
- B2 is the initial brightness measurement for each of the various indicia or portions of these indicia;
- B3 is the required change in brightness.
- X1 is the inverse of an increase in foot lamberts achieved per removal of 0.001 inches from the light translucent layer;
- PA is the amount of the light translucent layer in thousands of an inch that must be removed in order to achieve the desired brightness requirement (B1);
- P1 is the power setting for the carbon dioxide laser; and
- S1 is the travel rate of the carbon dioxide laser beam across the surface of the display panel.

It will be appreciated that X1 (the inverse of the increase in foot lamberts obtained per removal of 0.001 inches from the translucent layer) will vary depending on the composition of the translucent layer. For non-epoxy based paints, this change is normally on the order or 0.0015 to 0.005 foot-lamberts per removal of 0.001 inches of the light translucent layer. It should similarly be appreciated that the carbon dioxide laser beam parameters, that is the power level and speed rate, can be varied between 2 and 50 watts and 12 to 25 inches per second. This information can similarly be recorded in an appropriate lookup table, with selections from this table made based upon the amount of light translucent layer 30 to be removed.

This embodiment of the present invention may be applied to a variety of illuminated displays. It has been determined that use of a carbon dioxide laser beam can be used to etch through most conventional compositions used to form the light translucent layer. This embodiment of the present invention can also be used in the fabrication and light balancing of illuminated displays made in accordance with co-pending patent application Ser. No. 07/989,092 discussed above, where a clear separation layer is disposed between the light translucent layer 30 and the opaque layer 35. The carbon dioxide laser beam will also etch through the clear separation layer and the underlying light translucent layer without otherwise scorching or separating the light translucent layer. This embodiment of the present invention also avoids the time consuming and cost intensive process of manually abrading the light translucent layer of the display panel before application of the light absorptive and cover layers and formation of indicia in these layers. In some applications, however, the resulting depth of channels forming the display indicia, such as channels 42 and 44 in FIG. 4, may be deeper than desired after the display panel has been satisfactorily light balanced. Thus, for example, if it were desired to maintain the depth of channels 42 and 44 to within tolerances of a few 0.001 inches, this tolerance may be exceeded if too substantial of a laser etching were required to achieve satisfactory illumination uniformity in all of the indicia. Accordingly, an alternative embodiment of the present invention provides for etching the light translucent layer of an illuminated display panel before application of the light absorptive and cover layers and formation of the indicia in these layers.

Figure 2:
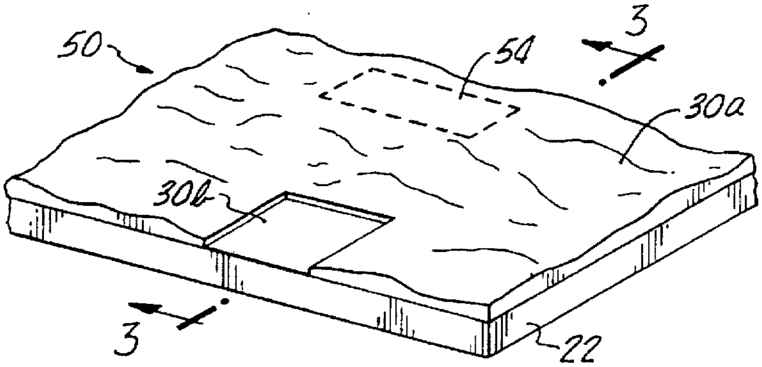
FIG. 2 is a perspective view of a partially fabricated illuminated display panel having a light translucent layer disposed on a display panel substrate.
Figure 3:
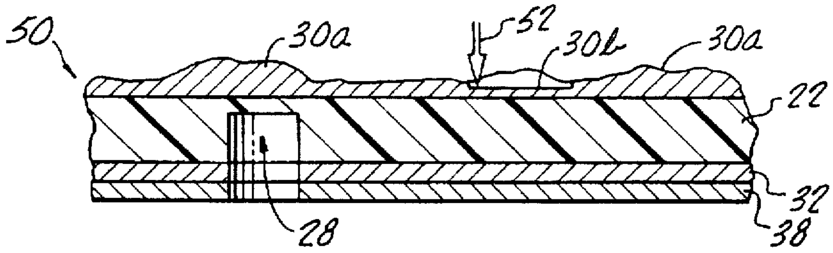
FIG. 3 is a sectional side view of a portion of the partially fabricated display panel illustrated in FIG. 2, along the line 3—3 in FIG. 2.

Referring to FIGS. 2 and 3, there is shown a partially fabricated illuminated display panel 50. In accordance with this embodiment of the present invention, an illuminated display panel is partially fabricated by applying a light translucent layer 30 to the front surface of the panel substrate 22 and similarly applying any desired light translucent layer 32 and light absorptive layer 38 to the rear surface of the panel substrate 22. If self-illumination is to be provided by light sources disposed within apertures 28 in the rear surface of the panel substrate 22, these apertures should also be formed. Typically the apertures 28 are formed by drilling into the panel substrate 22 after application of the light translucent and absorptive layers 32 and 38, respectively, as is well known in the illuminated display panel art.

The various light translucent layers 30 and 32 and the light absorptive layer 38 are then preferably cured and the now partially fabricated display panel 50 is then illuminated in some appropriate manner. For example, as discussed above in connection with the preceding embodiment, an array of lights such as that used to illuminate the display panel in normal use may be employed. When illuminated, the surface of the light translucent layer 30 is then scanned with an appropriate detector in order to identify regions of illumination deficiency. Variations in the thickness of the light translucent layer 30 may, for example, result in illumination deficient regions. A carbon dioxide laser beam is then used to etch these regions of illumination deficiency to reduce the thickness of light translucent layer 30 in these deficient regions and increase the level of light escaping from them. As shown in FIG. 3, a carbon dioxide laser beam, illustrated by arrow 52, may be used to etch a portion **30*b* of an irregular light translucent layer 30*a***.

The laser beam parameters employed in connection with the preceding embodiment discussed above, where the carbon dioxide laser beam is used to etch through existing indicia, are also applicable to this embodiment to the present invention. Thus, for example, the carbon dioxide laser beam preferably has a power level between 2 and 50 watts and a travel rate of 10 to 25 inches per second across the surface of the display panel so as to etch approximately 0.001 inches from the thickness of the light translucent layer 30 with each pass of the laser beam.

As noted above this embodiment of the present invention may be used to fabricate and light balance illuminated display panels without forming too deep of a channel in the indicia of the display panel. If desired, the entire front surface of the display panel may be scanned with a detector to identify all of the deficient regions in the light translucent layer 30 and the carbon dioxide laser then applied to all of these regions to light balance the entire surface of the display panel. Alternatively, however, only regions in areas 54 of the light translucent layer 30 where indicia **12*a*–12*g* will appear in the finished display panel need be measured and illumination deficiencies identified. As also discussed above in connection with the preceding embodiment, the surface of the light translucent layer 30 may be repetitively scanned with the detector and etched with the carbon dioxide laser beam until a desired level of uniform illumination is achieved in appropriate regions. Alternatively, however, equations (1)–(3) above may similarly be employed to eliminate repetitive scanning of the light translucent layer 30 with a detector. As previously mentioned, however, it is preferable to repetitively etch the light translucent layer 30 with a lower power carbon dioxide laser beam in order to achieve a desired level of etching on the order of about 0.001 inches per etching to avoid overheating the light translucent layer 30 and undesirable scorching or separation of the light translucent layer 30 from the panel substrate 22**.

The present invention provides a highly beneficial method of fabricating and light balancing illuminated display panels which eliminates convention light balancing procedures that are both tedious and costs intensive. It will, of course, be understood that modifications to the above-described invention will be apparent to others skilled in the art. For example, the light translucent layer applied to a display panel substrate may intentionally be made thicker than necessary to achieve a desired level of illumination. This intentionally thick light translucent layer may then be uniformly etched with the carbon dioxide laser beam to achieve desired levels of illumination uniformity throughout appropriate regions of the display panel. Accordingly, the scope of the present invention is not limited by the particular embodiments or the descriptions above, but is defined only by the claims set forth below and equivalents thereof.

What is claimed is:

1. A method for forming and light balancing an illuminated display panel comprising the steps of:
   - forming an unbalanced display panel by depositing a translucent layer on a panel substrate, depositing a light absorptive layer on the translucent layer and forming indicia in the light absorptive layer;
   - illuminating the unbalanced display panel;
   - measuring the uniformity of illumination from the indicia in the display panel and identifying illumination-deficient indicia; and
   - etching the illumination-deficient indicia with a laser beam so as to increase the amount of light from said illumination-deficient indicia by removing portions of the translucent layer underlying said illumination-deficient indicia, wherein the illuminated display panel is light balanced.

2. The light balancing method of claim 1, further comprising the step of calculating an amount of the translucent layer to be removed from underneath the illumination-deficient indicia by determining a difference between an initial brightness measurement for said illumination-deficient indicia and a desired brightness measurement for the illumination-deficient indicia, and multiplying said difference by a predetermined value representative of an inverse of the increase in illumination provided by a decrease in a thickness of the translucent layer.

3. The light balancing method of claim 2 further comprising the step of calculating a power level and travel rate for the laser beam as it etches the translucent layer underneath illumination-deficient indicia by reference to a preselected set of power settings and travel rates which achieve predetermined etch depths in the translucent layer.

4. The light balancing method of claim 1 wherein said laser beam is a continuous wave beam having a power level between 2 and 50 watts.

5. The light balancing method of claim 1 wherein the laser beam travels across the illuminated display panel translucent layer at a rate of 12 to 25 inches per second.

6. The light balancing method of claim 5 wherein the laser beam removes less than approximately 0.001 inches in a thickness of said translucent layer each time the laser beam traverses the surface of the panel.

7. The light balancing method of claim 1 wherein the brightness of indicia being etched by the laser beam is increased by less than approximately 0.0015 to 0.005 foot-lamberts each time the laser beam etches the indicia.

8. The light balancing method of claim 1 wherein the translucent and absorptive layers of the illuminated display panel are paints and wherein said paints are cured before the illumination uniformity measurement step and laser beam etching steps are performed.

9. The light balancing method of claim 1 wherein a transparent layer is applied between translucent layers and light absorptive layers and wherein the laser beam etches through both the clear layer and the translucent layer.

10. A method of forming a light balanced illuminated display panel, comprising the steps of:
    - applying a translucent layer to a panel substrate;
    - illuminating the panel substrate and translucent layer;
    - measuring the illumination uniformity of said translucent layer and identifying illumination-deficient regions in said layer;
    - etching said illumination-deficient regions in the translucent layer with a laser beam so as to increase the amount of light emitted from said regions by decreasing a thickness of the translucent layer within said regions; and
    - applying a light absorptive layer over the translucent layer and forming indicia in the light absorptive layer, wherein the level of illumination from the indicia of the illuminated display panel is balanced.

11. The method of claim 10 wherein said laser comprises a carbon dioxide laser that operates to produce a continuous wave beam having a power between 2 and 50 watts.

12. The method of claim 11 wherein the laser beam travels across the translucent layer of the illuminated display panel at a rate of 12 to 25 inches per second.

13. The method of claim 10 wherein the laser beam is used to remove less than approximately 0.001 inches in the thickness of illumination-deficient regions in said translucent layer each time the laser beam traverses the surface of the panel.

14. The method of claim 10 wherein the illumination from regions in said translucent region being etched by the laser beam is increased by less than approximately 0.0015 to 0.005 foot-lamberts each time the laser beam etches said illumination-deficient region in the translucent layer.

15. The method of claim 10 wherein the translucent layer is a paint and wherein said paint is cured before the illumination uniformity measurement and laser etching steps are performed.

16. The light balancing method of claim 10, further comprising the step of calculating an amount of the translucent layer to be removed from underneath the illumination-deficient indicia by determining a difference between an initial brightness measurement for said illumination-deficient indicia and a desired brightness measurement for the illumination-deficient indicia, and multiplying said difference by a predetermined value representative of an inverse of the increase in illumination provided by a decrease in a thickness of the translucent layer.

17. The light balancing method of claim 16 further comprising the step of calculating a power level and travel rate for the laser beam as it etches the translucent layer underneath illumination-deficient indicia by reference to a preselected set of power settings and travel rates which achieve predetermined etch depths in the translucent layer.

* * * * *